United States Patent [19]

Nagoshi

[11] Patent Number: 4,601,909

[45] Date of Patent: Jul. 22, 1986

[54] METHOD OF FREEZING FISHERY PRODUCTS

[75] Inventor: Kazunori Nagoshi, Matsuyama, Japan

[73] Assignee: Tadaaki Sakai, Osaka, Japan

[21] Appl. No.: 763,022

[22] Filed: Aug. 6, 1985

[51] Int. Cl.⁴ .......................... A23L 3/36; F25D 17/02
[52] U.S. Cl. .......................................... 426/524; 62/64; 426/643
[58] Field of Search ............... 426/524, 643, 393, 515; 62/64

[56] References Cited

U.S. PATENT DOCUMENTS 3,440,831  4/1969  Thompson ............................... 62/64
3,881,032  4/1975  Matsumoto et al. ................ 426/524

FOREIGN PATENT DOCUMENTS 55-3723  1/1980  Japan .................................. 426/643

Primary Examiner—George Yeung
Attorney, Agent, or Firm—Koda and Androlia

[57] ABSTRACT

A method of freezing sea food including the steps of preparing brine containing rapeseed oil added to a solution of propylene glycol, calcium chloride and water, cooling the brine and subsequently immersing the sea food in the brine for freezing.

2 Claims, 1 Drawing Figure

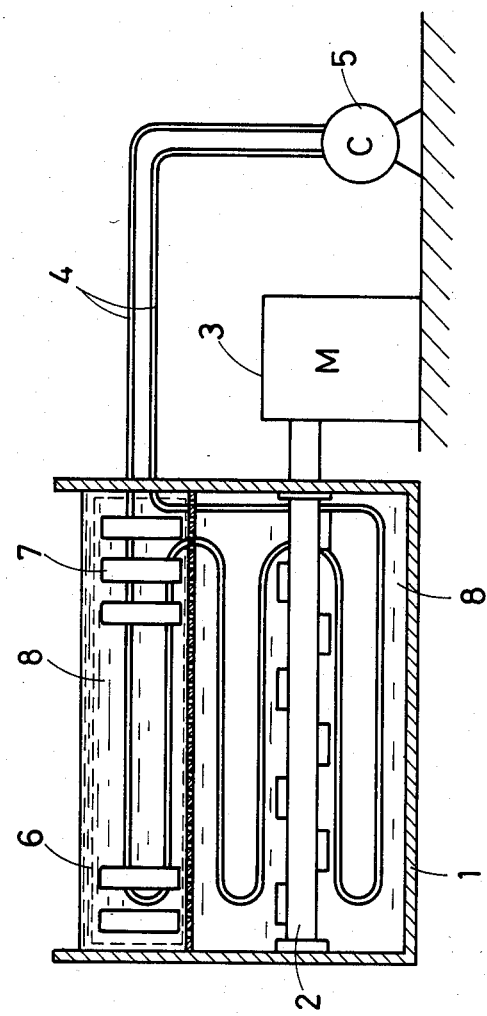

METHOD OF FREEZING FISHERY PRODUCTS

BACKGROUND OF THE INVENTION

1. Field of the Invention

The present invention related to a method of freezing sea food or fishery products and more particularly to a method of freezing sea food products such a tuna, lobster, oysters, whale meat and the like by immersing them in brine.

2. Prior Art

Conventional freezing methods for freezing fishery products include air or brine (antifreeze solution) cooled by a cooling medium, and freezing by immersing fishery products in liquid nitrogen or liquid carbon dioxide.

Since the foregoing methods create more or less a great amount of drip after thawing, however, weight loss or deterioration of the taste and quality of the fishery product occurs.

The cause for drip is likely due to breakdown of the muscular tissue of the meat of sea food by ice crystals which occur during the freezing process, which results in an increase of salt concentration in the tissue which has a relationship to the freezing rate.

This causes a drawback in that production costs are increased since the liquid nitrogen is expensive.

On the other hand, brine includes inorganic brine such as calcium chloride and organic brine such as ethylene glycol, propylene glycol, etc. Furthermore, the solution prepared by mixing the above ingredients is advantageous in that greater cooling is achieved at a comparatively lower price.

SUMMARY OF THE INVENTION

In view of the above, the primary object of the present invention is to provide a method for preventing deterioration of the quality of the sea food by means of restraining or preventing the occurrence of drip through an improvement in the brine, which is also lower in cost.

As a result of continuous study by the inventor, aiming to increase the freezing rate which is essential to prevent the occurrence of drip, the inventor discovered that if rapeseed oil is added to the brine, the freezing rate and, in addition, the thawing rate are considerably increased, resulting in the present invention.

In keeping with the principles of the present invention, the objects are accomplished by a unique method for freezing sea food, quickly finished by means of the brine, wherein the brine is prepared by adding rapeseed oil to a solution including propylene glycol, calcium chloride and water is first cooled. Subsequently the fishery products are immersed in the cooled brine for freezing.

No matter what amount of rapeseed oil is added, it will properly meet the requirements of the present invention provided that the amount of rapeseed oil is within a range making it possible to control the rise of the liquid's temperature when immersing the sea food in the brine, the most effective concentration being 0.1 to 0.5% in weight.

BRIEF DESCRIPTION OF THE DRAWING

The FIGURE is a schematic illustration of the freezing device which is used to put the present invention into practice.

DETAILED DESCRIPTION OF THE INVENTION

Cooling the brine to which the rapeseed oil is added causes fine ice crystal group to form therein, resulting in uniform distribution of the crystal groups.

When the sea food is immersed in the brine under in the foregoing state, the freezing rate is increased and the freezing time is considerably reduced in comparison to brine with no rapeseed oil added. Even after the sea food is put into the brine, the temperature of the liquid does not increase, staying approximately constant.

When thawing the sea food which has been frozen and stored by means of such a method, the thawing time can be reduced to a larger extent.

The reason for such a remarkable increase in the freezing rate is believed lie in that since the ice crystal groups caused by the addition of rapeseed oil become a source of supplying freezing latent heat to the sea food, the liquid's temperature is prevented from being raised, and the sea food is able to promptly pass the zone of maximum ice crystal formation ($-0.5°$ C. to $-5°$ C). Thus, breakdown of the muscular tissue due to large amounts of ice crystals is prevented and deterioration of the quality of the meat is also prevented.

Furthermore, although the process of thawing the sea food is not clarified, prompt thawing can prevent the growth of ice crystals so that breakdown of the muscular tissue is also prevented.

A detailed description of the embodiment according to the present invention will be made in conjunction with the accompanying drawing.

The drawing illustrates the freezing device for putting the present invention into practice in a typical manner. Numeral 1 is a tank, 2 is a stirring axis, 3 is a motor for rotating the stirring axis 2, 4 is piping arranged in the tank 1, 5 is a compressor and 6 is a basket for holding the meat pieces 7 of the fishery products. No matter what the processed form of the meat pieces 7 is, they are able to processed by this method. The meat pieces 7 may be in the form of rounds, dressed, fillets, steaks, etc.

The tank 1 is filled with brine 8 and the basket 6 is fully immersed in the brine 8. The brine 8 is cooled by a cooling medium which is circulated in the piping 4, while repeating compression, liquefaction, and evaporation, by means of the compressor 5.

The basket 6 in which the meat pieces 7 have been placed in advance is immersed in the brine 8 for a predetermined period of time and subsequently taken out of the brine 8.

The brine 8, which is cooled between $-30°$ C. and $-42°$ C., has a slight amount of rapeseed oil added to the contents of the brine which includes propylene glycol (40% in weight), calcium chloride (10% in weight), and water (50% in weight).

Table 1 shows the results obtained by in an experiment wherein the amount of rapeseed oil added to the brine is varied.

The experiment was performed under the following conditions: the temperature of the brine was $-35°$ C., steak-like whale meat about 20 mm thick were used as the meat pieces 7, and the meat pieces 7 were lined on the basket 6 at intervals of about 10 mm.

TABLE 1

| Amount of Rapeseed Oil Added (%) | Freezing Time (min.) | Thawing Time (min.) | Amount of Drip |
| --- | --- | --- | --- |
| 0 | 20 | 20 | larger |
| 0.05 | 15 | 16 | slight |
| 0.1 | 10 | 10 | nil |
| 0.5 | 10 | 10 | nil |
| 1.0 | 12 | 13 | slight |

As shown apparently in Table 1, if the amount of rapeseed oil added is within the range of 0.1 to 0.5% favorable results are obtained. The meat pieces which were frozen by the brine 8 to which the rapeseed oil is added in an amount in the range of 0.1 to 0.5% held flavor as good as fresh.

Further, an organoleptic test, performed during the frozen state, showed that the ice crystals in the frozen meat 7 to which no rapeseed oil was added extend radially from the center of the surface thereof, this phenomenon is believed to cause to drip. In contrast thereto, one thick ice crystal formed in the frozen meat pieces 7 in which rapeseed oil was added extended linearly or in folded manner toward the surface thereof, and almost all of the structure of the meat pieces was normal.

Since the present invention does not use expensive liquid nitrogen, etc. but rather uses economical and inexpensive brine and rapeseed oil, the cost of producing frozen fishery products can be lower.

Furthermore, since brine to which rapeseed oil has been added can reduce remarkably the freezing and thawing time, deterioration of the quality of the meat of the fishery products is prevented. In addition, production of frozen fishery products is advantageously improved by the present invention since production time is reduced.

I claim:

1. A method for freezing fishery products which consists of cooling brine to a temperature of $-30°$ C. to $-42°$ C. prepared by adding 0.1 to 0.5% by weight of rapeseed oil to a solution comprising 40% by weight of propylene glycol 10% by weight of calcium chloride and 50% by weight of water, and subsequently immersing the fishery products in said brine.

2. A method of freezing seafood comprising:
   cooling brine to a temperature of $-30°$ C. to $-42°$ C. prepared by adding 0.1 to 0.5% by weight of rapeseed oil into a solution which includes 40% by weight of propylene glycol, 10% by weight of calcium chloride and 50% by weight of water; and
   immersing and freezing said seafood in the cooled brine.

* * * * *